(12) United States Patent
Wang et al.

(10) Patent No.: US 7,381,755 B2
(45) Date of Patent: Jun. 3, 2008

(54) INKJET INK COMPOSITION AND INK/RECEIVER COMBINATION

(75) Inventors: Xiaoru Wang, Webster, NY (US); Huijuan D. Chen, Webster, NY (US); Ricky G. Frazier, Rochester, NY (US); Jin-Shan Wang, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/256,989

(22) Filed: Sep. 27, 2002

(65) Prior Publication Data

US 2004/0063807 A1    Apr. 1, 2004

(51) Int. Cl.
*C09D 11/00* (2006.01)
(52) U.S. Cl. ............ 523/160; 523/161; 106/31.6; 524/544; 524/551; 524/567; 524/568
(58) Field of Classification Search ............ 523/160, 523/161; 106/31.6; 524/544, 551, 567, 524/568
See application file for complete search history.

(56) References Cited

U.S. PATENT DOCUMENTS

| | | | |
|---|---|---|---|
| 4,004,405 A * | 1/1977 | Darchuk | 57/255 |
| 4,106,027 A | 8/1978 | Hoffmann et al. | |
| 4,156,616 A | 5/1979 | Dietz et al. | |
| 4,299,882 A * | 11/1981 | Togawa et al. | 428/329 |
| 4,311,775 A | 1/1982 | Regan | |
| 4,597,794 A | 7/1986 | Ohta et al. | |
| 4,698,651 A | 10/1987 | Moore et al. | |
| 4,762,875 A | 8/1988 | Gold | |
| 4,803,119 A * | 2/1989 | Duff et al. | 428/321.3 |
| 4,954,556 A * | 9/1990 | Bull et al. | 524/378 |
| 5,026,427 A | 6/1991 | Mitchell et al. | |
| 5,085,698 A | 2/1992 | Ma et al. | |
| 5,086,698 A | 2/1992 | Wirz | |
| 5,141,556 A | 8/1992 | Matrick | |
| 5,160,370 A | 11/1992 | Suga et al. | |
| 5,169,436 A | 12/1992 | Matrick | |
| 5,172,133 A | 12/1992 | Suga et al. | |
| 5,279,654 A | 1/1994 | Keirs et al. | |
| 5,324,349 A * | 6/1994 | Sano et al. | 106/31.25 |
| 5,630,868 A | 5/1997 | Belmont et al. | |
| 5,912,280 A * | 6/1999 | Anton et al. | 523/161 |
| 5,997,622 A | 12/1999 | Weber et al. | |
| 6,001,161 A | 12/1999 | Evans et al. | |
| 6,087,416 A | 7/2000 | Pearlstine et al. | |
| 6,245,832 B1 * | 6/2001 | Suzuki et al. | 523/160 |
| 6,268,101 B1 | 7/2001 | Yacobucci | |
| 6,426,375 B1 * | 7/2002 | Kubota | 523/160 |
| 6,468,338 B1 * | 10/2002 | Evans et al. | 106/31.5 |
| 6,506,240 B2 * | 1/2003 | Takemoto et al. | 106/31.36 |
| 6,524,383 B2 * | 2/2003 | Komatsu et al. | 106/493 |
| 6,773,102 B2 * | 8/2004 | Chen et al. | 347/100 |
| 7,008,977 B2 * | 3/2006 | Sakai et al. | 523/200 |
| 2002/0161069 A1 * | 10/2002 | Frenkel et al. | 523/160 |
| 2003/0050362 A1 * | 3/2003 | Sakai et al. | 523/160 |
| 2003/0078320 A1 * | 4/2003 | Yatake | 523/160 |
| 2003/0083396 A1 * | 5/2003 | Ylitalo et al. | 522/74 |
| 2003/0149133 A1 * | 8/2003 | Lau et al. | 523/160 |
| 2004/0130608 A1 * | 7/2004 | Campbell et al. | 347/100 |

FOREIGN PATENT DOCUMENTS

| | | |
|---|---|---|
| EP | 0 882 104 B1 | 11/1986 |
| EP | 0365388 A1 | 4/1990 |
| EP | 571190 A2 * | 11/1993 |
| EP | 0984046 A | 3/2000 |
| EP | 1314766 A1 | 5/2003 |
| WO | WO 02/059222 A1 | 8/2002 |

OTHER PUBLICATIONS

Brandup, J., Immergut E.H., Grulke, E.A.; Polymer Handbook 4th Ed., John Wiley & Sons, New York, 1999 (p. VI/215).*

* cited by examiner

*Primary Examiner*—Bernard Lipman
(74) *Attorney, Agent, or Firm*—Doreen M. Wells; Chris P. Konkol

(57) ABSTRACT

An aqueous ink jet ink composition including a pigment, a polymer latex containing at least one halogenated vinyl monomer, at least one surfactant, and a humectant. An ink and receiver combination for a non-absorbing substrate is also disclosed.

13 Claims, No Drawings

INKJET INK COMPOSITION AND INK/RECEIVER COMBINATION

CROSS REFERENCE TO RELATED APPLICATIONS

This application relates to commonly assigned copending application Ser. No. 10/256,591, now Publication No. 2004/0061753 entitled AN AQUEOUS INKJET INK AND RECEIVER COMBINATION; application Ser. No. 10/256,589, now Publication No. 2004/0061754 entitled INKJET PRINTING METHOD WITH AN INK/RECEIVER COMBINATION; and application Ser. No. 10/256,822, now Publication No. 2004/0061755, entitled INKJET PRINTING METHOD, filed simultaneously herewith. These copending applications are incorporated by reference herein for all that they contain.

FIELD OF THE INVENTION

The present invention relates to an aqueous ink jet ink composition comprising pigment and a polymer latex. The polymer latex is prepared from at least one halogenated vinyl monomer.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging and large format printing for outdoor applications such as banners, signages, displays, posters, billboard and buswraps.

This technique of printing is well suited for printing on a variety of surfaces (receivers) including porous and non-porous surfaces. Porous inkjet receivers have the advantage of large fluid intake and this provides fast printing speed. However, in some applications, such as banners, signages, displays, posters, billboard and buswraps, these porous receivers suffer from durability issues such as lightfastness, waterfastness, abrasion resistance and weather resistance. In order to overcome these problems, the prints are usually post treated by methods such as lamination, which adds to the cost considerably. Historically, in order to overcome these problems, solvent based inks or UV curable inks were developed for printing on non-absorbing substrates such as vinyl to achieve the desired durability. U.S. Pat. No. 4,106,027 describes such a solvent-based ink that is suitable for printing images on non-absorbing receivers with improved adhesion and durability. EP 0 882 104 B1 describes a UV curable inkjet ink composition for better durability of the print on non-absorbing substrate. A significant environmental, health and safety concern with both of these types of ink is the evaporation of solvent or UV monomer during printing.

U.S. Pat. No. 6,087,416 describes the use of an aqueous based pigment ink for printing on non-absorbing vinyl substrate. That ink contains a grafted copolymer binder that is soluble in the aqueous vehicle but insoluble in water. However, the problem with the ink is that, due to the soluble nature of the binder in the ink vehicle, the ink viscosity is high and the printing reliability is poor. In addition, the printed images are not durable to solvents.

U.S. Pat. No. 4,762,875 described a printing ink containing pigment and polymer additives for plastics and metal surfaces. However, there is a problem with this invention that the solid content for this ink is high, therefore the viscosity of the ink is too high for inkjet ink applications; in addition, the additives used in this invention is hydrophilic in nature therefore the resulted coatings has poor water resistance.

Therefore, there is a need for an aqueous based ink jet ink that provides good waterfastness, lightfastness, abrasion resistance, good adhesion to non-absorbing substrates including untreated vinyl, and that can be printed reliably through a piezo or thermal printhead.

SUMMARY OF THE INVENTION

The present invention provides an aqueous based ink jet ink that provides good waterfastness, lightfastness, abrasion resistance, good adhesion to non-absorbing substrates including untreated vinyl, and can be printed reliably through a piezo or thermal printhead. These and other objects are achieved in accordance with the present invention which comprises an ink jet ink composition comprising:
   a pigment;
   a polymer latex containing at least one halogenated vinyl monomer;
   at least one surfactant; and
   a humectant.
Another embodiment of the invention discloses:
An aqueous inkjet ink and receiver combination wherein the aqueous inkjet ink comprises:
   a pigment;
   a polymer latex containing at least one halogenated vinyl monomer;
   at least one surfactant;
   a humectant; and
the receiver comprises a non-absorbing substrate.

It was found that the colloid stability, stain resistance and abrasion resistance of an ink jet image was improved using the composition described herein.

DETAILED DESCRIPTION OF THE INVENTION

The ink composition of the present invention is suited for printing on a variety of substrates, including non-absorbing substrates. The non-absorbing substrates that may be used in the present invention include any substrate that is essentially non-porous. They are usually not specially treated for additional liquid absorption. Therefore, these materials have very low or no liquid absorbing capacity. Examples of such non-absorbing substrates are metals such as aluminum, copper, stainless steel and alloy etc.; plastics such as vinyl, polycarbonate, polytetrafluoroethylene (PTFE), polyethylene, polypropylene, polystyrene, cellulose; and other substrates such as ceramics, glass.

In order to achieve good image durability when printing aqueous based inks onto a non-absorbing substrate, the polymeric binder in the ink composition needs to be essentially hydrophobic, capable of providing good adhesion strength to the non-absorbing substrate, and also must not be easily re-dispersible in water after drying. In addition, in order to provide good ink storage stability and prevent potential nozzle clogging, the hydrophobic polymer binder also needs to be sufficiently stable as a dispersion and compatible with other ink components, such as surfactant, colorants and humectants. Therefore, the polymer binders need to be dispersible in aqueous ink environment but not soluble therein to achieve low ink viscosity and print durability to both water and solvents. Furthermore, the ink should have sufficiently low surface tension to have good wettability to the non-absorbing substrate.

The pigment used in the present invention can be either self-dispersible such as those described in U.S. Pat. No. 5,630,868, encapsulated as those described in the pending U.S. patent application Ser. No. 09/822,723, filed Mar. 30, 2001, or can be stabilized by a dispersant. The process of preparing inks from pigments commonly involves two steps: (a) a dispersing or milling step to break up the pigment to the primary particle, and (b) dilution step in which the dispersed pigment concentrate is diluted with a carrier and other addenda to a working strength ink. In the milling step, the pigment is usually suspended in a carrier (typically the same carrier as that in the finished ink) along with rigid, inert milling media. Mechanical energy is supplied to this pigment dispersion, and the collisions between the milling media and the pigment cause the pigment to deaggregate into its primary particles. A dispersant or stabilizer, or both, is commonly added to the pigment dispersion to facilitate the deaggregation of the raw pigment, to maintain colloidal particle stability, and to retard particle reagglomeration and settling.

There are many different types of materials which may be used as milling media, such as glasses, ceramics, metals, and plastics. In a preferred embodiment, the grinding media can comprise particles, preferably substantially spherical in shape, e.g., beads, consisting essentially of a polymeric resin. In general, polymeric resins suitable for use as milling media are chemically and physically inert, substantially free of metals, solvent and monomers, and of sufficient hardness and firability to enable them to avoid being chipped or crushed during milling. Suitable polymeric resins include crosslinked polystyrenes, such as polystyrene crosslinked with divinylbenzene, styrene copolymers, polyacrylates such as poly(methyl methylacrylate), olycarbonates, polyacetals, such as Derlin™, vinyl chloride polymers and copolymers, polyurethanes, polyamides, poly(tetrafluoroethylenes), e.g., Teflon™, and other fluoropolymers, high density polyethylenes, polypropylenes, cellulose ethers and esters such as cellulose acetate, poly(hydroxyethylmethacrylate), poly(hydroxyethylacrylate), silicone containing polymers such as polysiloxanes and the like. The polymer can be biodegradable. Exemplary biodegradable polymers include poly(lactides), poly(glycolids) copolymers of lactides and glycolide, polyanhydrides, poly(imino carbonates), poly(N-acylhydroxyproline) esters, poly(N-palmitoyl hydroxyprolino) esters, ethylene-vinyl acetate copolymers, poly(orthoesters), poly(caprolactones), and poly(phosphazenes). The polymeric resin can have a density from 0.9 to 3.0 g/cm3. Higher density resins are preferred inasmuch as it is believed that these provide more efficient particle size reduction. Most preferred are crosslinked or uncrosslinked polymeric media based on styrene.

Milling can take place in any suitable grinding mill. Suitable mills include an air jet mill, a roller mill, a ball mill, an attritor mill and a bead mill. A high speed mill is preferred. By high speed mill we mean milling devices capable of accelerating milling media to velocities greater than about 5 meters per second. Sufficient milling media velocity is achieved, for example, in Cowles-type saw tooth impeller having a diameter of 40 mm when operated at 9,000 rpm. The preferred proportions of the milling media, the pigment, the liquid dispersion medium and dispersant can vary within wide limits and depends, for example, up on the particular material selected and the size and density of the milling media etc. After milling is complete, the dispersion of active material is separated from the grinding media by simple sieving or filtration. With either of the above modes the preferred amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. For aqueous ink jet inks, the pigment is usually present in the mill grind at 1 to 50 weight %, excluding the milling media. The weight ratio of pigment to dispersant is 20:1 to 1:2. The high speed mill is a high agitation device, such as those manufactured by Morehouse-Cowles, Hockmeyer et al.

The dispersant is another ingredient in the mill grind. It can be either a small molecule or a polymer. Preferred dispersants used in the present invention include sodium dodecyl sulfate, acrylic and styrene-acrylic copolymers, such as those disclosed in U.S. Pat. Nos. 5,085,698 and 5,172,133, and sulfonated polyesters and styrenics, such as those disclosed in U.S. Pat. No. 4,597,794. Other patents referred to above in connection with pigment availability also disclose a wide variety of dispersants. The dispersant used in the examples is potassium N-methyl-N-oleoyl taurate (K-OMT).

The milling time can vary widely and depends upon the pigment, mechanical means and residence conditions selected, the initial and desired final particle size, etc. For aqueous mill grinds using the preferred pigments, dispersants, and milling media described above, milling times will typically range from 1 to 100 hours. The milled pigment concentrate is preferably separated from the milling media by filtration.

The pigment particles useful in the invention may have any particle sizes which can be jetted through a print head. Preferably, the pigment particles have a mean particle size of less than about 0.5 micron, more preferably less than about 0.2 micron.

A wide variety of organic and inorganic pigments, alone or in combination, may be selected for use in the present invention. Colorant particles which may be used in the invention include pigments as disclosed, for example in U.S. Pat. Nos. 5,026,427; 5,086,698; 5,141,556; 5,160,370; and 5,169,436, the disclosures of which are hereby incorporated by reference. The exact choice of pigments will depend upon the specific application and performance requirements such as color reproduction and image stability. Pigments suitable for use in the present invention include, for example, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. Typical examples of pigments which may be used include Color Index (C.I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124,126,127,128,129, 130,133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C.I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68,69; C.I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Violet 1, 2, 3, 5:1, 13, 19, 23, 25, 27, 29, 31, 32, 37, 39, 42, 44, 50; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66; C.I. Pigment Green 1, 2, 4, 7, 8, 10, 36, 45; C.I. Pigment Black 1, 7, 20, 31, 32, and C.I. Pigment Brown 1, 5, 22, 23, 25, 38, 41, 42. In a preferred embodiment of the invention, the pigment is C.I. Pigment Blue 15:3, C.I. Pigment Red 122, C.I. Pigment Yellow 155, C.I. Pigment Yellow 74, C.I. Pigment Black 7 or bis(phthalocyanylalumino)tetraphenyldisiloxane as described in U.S. Pat. No. 4,311,775, the contents of which are incorporated herein by reference.

In the case of organic pigments, the ink may contain up to approximately 20% pigment by weight, but will generally be in the range of approximately 0.1 to 10%, preferably approximately 0.1 to 5%, by weight of the total ink composition for most ink jet printing applications. If an inorganic pigment is selected, the ink will tend to contain higher weight percentages of pigment than with comparable inks employing organic pigments.

Instead of pigment, a dye can also be used in the current invention. Preferably, the dye is a water insoluble dye. To make the ink, the water insoluble dye can be dispersed or encapsulated into water dispersible particles as disclosed in U.S. Ser. No. 10/020,694, filed Dec. 14, 2001. A broad range of water-insoluble dyes may be used in the invention such as an oil dye, a disperse dye, or a solvent dye, such as Ciba-Geigy Orasol Red G, Ciba-Geigy Orasol Blue GN, Ciba-Geigy Orasol Pink, and Ciba-Geigy Orasol Yellow. Preferred water-insoluble dyes can be xanthene dyes, methine dyes, polymethine dyes, anthroquinone dyes, merocyanine dyes, azamethine dyes, azine dyes, quinophthalone dyes, thiazine dyes, oxazine dyes, phthalocyanine dyes, mono or poly azo dyes, and metal complex dyes. More preferably, the water insoluble dyes can be an azo dye such as a water insoluble analog of the pyrazoleazoindole dye disclosed in U.S. Ser. No. 09/689,184 filed Oct. 12, 2000, incorporated herein by reference, and the arylazoisothiazole dye disclosed in U.S. Pat. No. 4,698,651, incorporated herein by reference, or a metal-complex dye, such as the water-insoluble analogues of the dyes described in U.S. Pat. Nos. 5,997,622 and 6,001,161, both incorporated herein by reference, i.e., a transition metal complex of an 8-heterocyclylazo-5-hydroxyquinoline. The solubility of the water insoluble dye used in the present invention should be less than 1 g/L in water, and more preferably less than 0.5 g/L in water.

The water insoluble dye can be present in any effective amount in the ink of the present invention, usually up to about 20% by weight of an ink jet ink composition, and preferably from about 0.05 to 15 wt. %.

The polymer latex used in this invention can be homopolymer or copolymer or cross-linked polymer prepared with at least one halogenated vinyl monomer, and optionally other ethylenically-unsaturated monomers such that the latex can be stabilized in a water-based medium. The polymer latex contains an ethylenically-unsaturated monomer capable of addition polymerization. The ethylenically-unsaturated monomers which can be used in the invention include, for example, the following monomers and their mixtures: acrylic acid, methacrylic acid, ethacrylic acid, methyl acrylate, ethyl acrylate, ethyl methacrylate, benzyl acrylate, benzyl methacrylate, propyl acrylate, propyl methacrylate, iso-propyl acrylate, iso-propyl methacrylate, butyl acrylate, butyl methacrylate, hexyl acrylate, hexyl methacrylate, octadecyl methacrylate, octadecyl acrylate, lauryl methacrylate, lauryl acrylate, hydroxyethyl acrylate, hydroxyethyl methacrylate, hydroxyhexyl acrylate, hydroxyhexyl methacrylate, hydroxyoctadecyl acrylate, hydroxyoctadecyl methacrylate, hydroxylauryl methacrylate, hydroxylauryl acrylate, phenethylacrylate, phenethyl methacrylate, 6-phenylhexyl acrylate, 6-phenylhexyl methacrylate, phenyllauryl acrylate, phenyllaurylmethacrylate, 3-nitrophenyl-6-hexyl methacrylate, 3-nitrophenyl-18-octadecyl acrylate, ethyleneglycol dicyclopentyl ether acrylate, vinyl ethyl ketone, vinyl propyl ketone, vinyl hexyl ketone, vinyl octyl ketone, vinyl butyl ketone, cyclohexyl acrylate, 3-methacryloxypropyl-dimethylmethoxysilane, 3-methacryloxypropyl-methyldimethoxysilane, 3-methacryloxypropyl-pentamethyldisiloxane, 3-methacryloxypropyltris-(trimethylsiloxy)silane, 3-acryloxypropyl-dimethylmethoxysilane, acryloxypropylmethyldimethoxysilane, trifluoromethyl styrene, trifluoromethyl acrylate, trifluoromethyl methacrylate, tetrafluoropropyl acrylate, tetrafluoropropyl methacrylate, heptafluorobutyl methacrylate, isobutyl acrylate, isobutyl methacrylate, 2-ethylhexyl acrylate, 2-ethylhexyl methacrylate, isooctyl acrylate, isooctyl methacrylate, N,N-dihexyl acrylamide, N,N-dioctyl acrylamide, N,N-dimethylaminoethyl acrylate, N,N-dimethylaminoethyl methacrylate, N,N-diethylaminoethyl acrylate, N,N-diethylaminoethyl methacrylate, piperidino-N-ethyl acrylate, vinyl propionate, vinyl acetate, vinyl butyrate, vinyl butyl ether, and vinyl propyl ether ethylene, styrene, vinyl carbazole, vinyl naphthalene, vinyl anthracene, vinyl pyrene, methyl methacrylate, methyl acrylate, alpha-methylstyrene, dimethylstyrene, methylstyrene, vinylbiphenyl, glycidyl acrylate, glycidyl methacrylate, glycidyl propylene, 2-methyl-2-vinyl oxirane, vinyl pyridine, aminoethyl methacrylate, aminoethylphenyl acrylate, maleimide, N-phenyl maleimide, N-hexyl maleimide, N-vinyl-phthalimide, and N-vinyl maleimide poly(ethylene glycol) methyl ether acrylate, polyvinyl alcohol, vinyl pyrrolidone, vinyl 4-methylpyrrolidone, vinyl 4-phenylpyrrolidone, vinyl imidazole, vinyl 4-methylimidazole, vinyl 4-phenylimidazole, acrylamide, methacrylamide, N,N-dimethyl acrylamide, N-methyl acrylamide, N-methyl methacrylamide, aryloxy dimethyl acrylamide, N-methyl acrylamide, N-methyl methacrylamide, aryloxy piperidine, and N,N-dimethyl acrylamide acrylic acid, methacrylic acid, chloromethacrylic acid, maleic acid, allylamine, N,N-diethylallylamine, vinyl sulfonamide, sodium acrylate, sodium methacrylate, ammonium acrylate, ammonium methacrylate, acrylamidopropanetriethylammonium chloride, methacrylamidopropane-triethylammonium chloride, vinyl-pyridine hydrochloride, sodium vinyl phosphonate and sodium 1-methylvinylphosphonate, sodium vinyl sulfonate, sodium 1-methylvinyl-sulfonate, sodium styrenesulfonate, sodium acrylamidopropanesulfonate, sodium methacrylamidopropanesulfonate, and sodium vinyl morpholine sulfonate, allyl methacrylate, allyl acrylate, butenyl acrylate, undecenyl acrylate, undecenyl methacrylate, vinyl acrylate, and vinyl methacrylate; dienes such as butadiene and isoprene; esters of saturated glycols or diols with unsaturated monocarboxylic acids such as, ethylene glycol diacrylate, ethylene glycol dimethacrylate, triethylene glycol dimethacrylate, 1,4-butanediol dimethacrylate, 1,3-butanediol dimethacrylate, pentaerythritol tetraacrylate, trimethylol propane trimethacrylate and polyfunctuional aromatic compounds such as divinylbenzene.

The halogenated vinyl monomer used in the present invention can be vinyl chloride, vinylidene chloride, vinyl fluoride, vinylidene fluoride, vinyl bromide and vinylidene bromide, chloromethacrylic acid and the like.

Surfactants that can be used in the present invention to synthesize the polymers include, for example, a sulfate, a sulfonate, a cationic compound, a reactive surfactant, an amphoteric compound, and a polymeric protective colloid. Specific examples are described in "McCutcheon's Emulsifiers and Detergents: 1995, North American Editor" and will be known to those skilled in the art.

Depending on the types of initiators used, the reaction temperature can vary from about 30° C. to about 90° C. Preferably the reaction temperature is at least 40° C., and most preferably at least 50° C. To ensure that no free monomer is present, usually the reaction is continued for a time after the monomer addition. Also, more initiator may need to be added as a scavenger during the final stage of the reaction to increase the reaction conversion.

Addition polymerization initiators useful in the practice of the invention include, for example, azo and diazo compounds, such as 2,2'-azobisisobutyronitrile, 2,2'-azobis(2,4-dimethyl valeronitrile), 2,2'-azobis(2,3-dimethyl butyronitrile), 2,2'-azobis(2-methyl butyronitrile), 2,2'-azobis(2,3,3-trimethyl butyronitrile), 2,2'-azobis(2-isopropyl butyronitrile), 1,1'-azobis(cyclohexane-1-carbonitrile), 2,2'-azobis(4-methoxyl-2,4-dimethyl valeronitrile), 2-(carbamoylazo)isobutyronitrile, 4,4'-azobis(4-cyanovaleric acid), and dimethyl-2,2'azobis isobutyrate, or peroxide compounds, such as butyl peroxide, propyl peroxide, butyryl peroxide, benzoyl isobutyryl peroxide, and benzoyl peroxide, or water soluble initiators, for example, sodium persulfate, and potassium persulfate, or any redox initiators. Preferred initiators are the oil soluble initiators. Examples of particularly suitable initiators are azo, peroxide, persulfate, and redox initiators. The initiators may be used in an amount varying from about 0.2 to 4 weight percent or higher by weight of the total monomers. A chain transfer agent such as butyl mercaptan, may also be used to control the properties of the polymer formed.

The polymers can be made via emulsion polymerization, dispersion polymerization, suspension polymerization, grand milling, or solution/bulk polymerization and then post-emulsification. Detailed information about the process and the stabilizers can be found in "*Emulsion Polymerization and Emulsion Polymers*" (P. A. Lovell, M. S. El-Aasser, John Wiley & Sons Ltd., England, 1997), incorporated herein by reference.

The polymer latex employed in the invention in general has a Tg of −50 to 150° C., preferably 5 to 100° C., most preferably 10 to 80° C.

The polymer latex employed in the invention in general have an average particle size of less than 2 μm, preferably less than 0.5 μm, more preferably less than 0.25 μm.

The polymer latex used in the invention is present in the ink jet ink generally from 0.1% to 20% by weight, preferably from 0.5% to 10% by weight.

All monomer units in the polymer latex used in the invention may be hydrophobic. Alternatively, the polymer latex may contain at least one hydrophilic monomer unit. The content of hydrophilic monomer unit is less than 50 mole % of the total monomer units in the polymer latex, preferably less than 20 mole % of the total monomer units in the polymer latex, most preferably less than 5 mole % of the total monomer units in the polymer latex.

The hydrophilic monomer unit in the polymer latex may be selected from the group consisting of acrylic acid, methacrylic acid, chloromethacrylic acid, maleic acid, allylamine, N,N-diethylallylamine, vinyl sulfonamide, sodium acrylate, sodium methacrylate, ammonium acrylate, ammonium methacrylate, acrylamidopropane-triethylammonium chloride, methacrylamidopropane-triethylammonium chloride, vinyl-pyridine hydrochloride, sodium vinyl phosphonate and sodium 1-methylvinylphosphonate, sodium vinyl sulfonate, sodium 1-methylvinyl-sulfonate and sodium styrenesulfonate. The hydrophilic monomers can also be nonionic, such as ethyoxytriethylene glycol methacrylate, methoxypolyethylene oxide methacrylate, methoxypropylene oxide acrylate, polyethyleneoxide methacrylate, polyethylenoxide acrylate, N-vinyl pyrrolidone and the like.

The aqueous carrier medium for the ink composition is water or a mixture of water and at least one water miscible co-solvent. Selection of a suitable mixture depends on requirements of the specific application, such as desired surface tension and viscosity, the selected pigment, drying time of the pigmented ink jet ink, and the type of paper onto which the ink will be printed. Representative examples of water-miscible co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, tetraethylene glycol, propylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, diethylene glycol mono-butyl (or -ethyl) ether, propylene glycol mono-methyl (or -ethyl) ether, poly(ethylene glycol) butyl ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide, 2,2'-thiodiethanol, and tetramnethylene sulfone.

The amount of aqueous carrier medium is in the range of approximately 70 to 99 weight %, preferably approximately 90 to 98 weight %, based on the total weight of the ink. A mixture of water and a polyhydric alcohol, such as diethylene glycol, is useful as the aqueous carrier medium. In a preferred embodiment, the inks contain from about 5 to about 60 weight % of water miscible organic solvent based on the total weight of the aqueous carrier medium.

Jet velocity, separation length of the droplets, drop size and stream stability are greatly affected by the surface tension and the viscosity of the ink. Pigmented ink jet inks suitable for use with ink jet printing systems should have a surface tension in the range of about 20 dynes/cm to about 60 dynes/cm and, more preferably, in the range 30 dynes/cm to about 50 dynes/cm. Control of surface tensions in aqueous inks is accomplished by additions of small amounts of surfactants. The level of surfactants to be used can be determined through simple trial and error experiments, usually about 0.1% to about 6%, preferably, 0.5% to about 4% by weight of the total ink composition. Anionic, cationic and nonionic surfactants may be selected from those disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont and the Fluorads® from 3M. Preferred surfactants can be silicon surfactants or fluorinated surfactants. Preferred silicon surfactants are available from BYK-Chemie as BYK surfactants, and from Crompton Corp, as Silwet® surfactants. Commercially available fluorinated surfactants can be the Zonyls® from DuPont and the Fluorads® from 3M, they can be used alone or in combination with other surfactants.

A humectant is added to the composition employed in the process of the invention to help prevent the ink from drying out or crusting in the orifices of the ink jet printhead. Polyhydric alcohols useful in the composition employed in the invention for this purpose include, for example, ethylene glycol, diethylene glycol, triethylene glycol, propylene glycol, tetraethylene glycol, polyethylene glycol, glycerol, 2-methyl-2,4-pentanediol, 1,2,6-hexanetriol and thioglycol. The humectant may be employed in a concentration of from about 10 to about 50% by weight of the entire ink composition. In a preferred embodiment, diethylene glycol or a mixture of glycerol and diethylene glycol is employed a concentration of between 10 and 20% by weight of the entire ink composition.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

A penetrant (0-10% by weight) may also be added to the ink composition employed in the process of the invention to help the ink penetrate the receiving substrate, especially when the substrate is a highly sized paper. A preferred penetrant for the inks employed in the present invention is n-propanol at a final concentration of 1-6% by weight.

A biocide (0.01-1.0% by weight) may also be added to prevent unwanted microbial growth which may occur in the ink over time. A preferred biocide for the inks employed in the present invention is Proxel® GXL (Zeneca Colours Co.) at a concentration of 0.05-0.5% by weight. Additional additives which may optionally be present in ink jet inks include thickeners, conductivity enhancing agents, anti-kogation agents, pH buffering agents, drying agents, and defoamers.

Ink jet inks made using water-dispersible polymers employed in this invention are employed in ink jet printing wherein liquid ink drops are applied in a controlled fashion to an ink receiving substrate, by ejecting ink droplets from plurality of nozzles, or orifices, in a print head of ink jet printers.

Commercially available ink jet printers use several different methods to control the deposition of the ink droplets. Such methods are generally of two types: continuous stream and drop-on-demand.

In drop-on-demand systems, a droplet of ink is ejected from an orifice directly to a position on the ink receiving layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

To accelerate the printing speed and increase durability, an extra heating step can be added during the process of printing the ink composition of this invention. This heating step can be employed either during printing or after printing. In a preferred embodiment, heating is employed both during and after printing. Heating will help fluids to spread on a non-absorbing substrate as well as to accelerate its evaporation. Heating can also help ink components to penetrate into the non-absorbing substrate by swelling mechanism. The heating step during printing can be achieved using a heating means so that the non-absorbing substrate is heated to elevated temperature during the process of printing. The substrate is preferably heated to between 30° C. and 90° C., more preferably between 40 to 70° C. During the heating step after printing, the printed substrate is heated to elevated temperature using a heating means where substrate is heated to a temperature range between 50° C. and 150° C., more preferably between 80 to 120° C. Various methods may be used for the means of heating, for example, using light irradiation, a hot air source or an electrical heater. For the heating step during printing, an electrical heater or an infrared lamp is preferred. For the heating step after printing, light irradiation such as an infrared lamp is preferred. Optionally, an infrared absorbing material can be employed in the ink of the present invention to assist the heating by an infrared lamp.

The following examples illustrate the utility of the present invention.

EXAMPLES

Preparation of Pigment Dispersion

The magenta pigment dispersion contains: 300 g of Polymeric beads, mean diameter of 50 μm (milling media); 30 g of quinacridone magenta pigment Pigment Red 122 (Sun Chemicals); 9 g of Oleoyl methyl taurine, (OMT) Potassium salt and 208 g of Deionized water, and 0.2 g of Proxel GXL® (biocide from Zeneca). The above components were milled in a 2 liter double walled vessel obtained from BYK-Gardner using a high energy media mill manufactured by Morehouse-Cowles Hochmeyer. The mill was run for approximately 8 hours at room temperature. The dispersion was separated from the milling media by filtering the millgrind through a 4-8 μm KIMAX® Buchner Funnel obtained from VWR Scientific Products. At the end of milling, additional water is added to the dispersion so that the pigment is about 10.0% by weight of the total final dispersion and the biocide is about 230 ppm by weight of the total final dispersion. The particle size is about 30 nm as measured by MICROTRAC II Ultrafine particle analyzer (UPA) manufactured by Leeds & Northrup.

Preparation of Polymer Latex Particle Dispersions

Preparation of Comparative Polymer Dispersion 1 (PC-1: Acrylate)

400 g of deionized water and 0.6 g Olin 10G® surfactant were charged to a 1-liter, three-neck round-bottom flask equipped with a mechanical stirrer and nitrogen inlet. The solution was purged with nitrogen for 30 min and heated to 80° C. in a constant temperature bath. 172.8 g of methyl acrylate and 7.2 g of 2-acrylamido-2-methyl-1-propanesulfonic acid (sodium salt) were added and stirred for three minutes. 16.4 g of 10% sodium persulfate solution and 5.5 g of 10% sodium metabisulfite solution were added to initiate the polymerization. Polymerization was continued for one hour and heated one more hour at 80° C. The temperature was reduced to 65-70° C. and 1 ml each of t-butyl hydroperoxide (10%) and sodium formaldehyde bisulfite (10%) were post-added. The latex was cooled and filtered. The dispersion contains 30% solid by weight.

Preparation of Comparative Polymer Dispersion 2 (PC-2: Watersoluble)

Water soluble polymer Jonrez IJ-4655® is obtained from Westvaco as a styrene acrylic polymer solution at 25% Solids. This polymer dispersion is designated as Comparative Polymer Dispersion 2 (PC-2).

Preparation of Polymer Latex 1 of the Invention (P-1)

160 g deionized water were charged to a 500 mL 1-neck round bottom flask equipped with mechanical stirrer. The flask was first flushed with nitrogen for 20 minutes, then immersed in a constant temperature bath at 40° C. Afterwards, 0.25 g of potassium persulfate, 0.35 g sodium metabisufite, 2.0 g Triton 770 (30% active), 4.0 g (9.7 mole percent) of ethyl acrylate, 36.0 g (90.3 mole percent) vinylidene chloride were added to the flask. The polymerization reaction was continued for additional 12 hours. The latex was cooled and filtered. The final polymer latex dispersion contained 13.52% solid by weight and the average particle size is 0.056 micron. This polymer dispersion is designated as Polymer Latex 1 (P-1).

Preparation of Latex Polymer 2 of the Invention (P-2)

160 g deionized water were charged to a 500 mL 1-neck round bottom flask equipped with mechanical stirrer. The flask was first flushed with nitrogen for 20 minutes, then immersed in a constant temperature bath at 40° C. Afterwards, 0.25 g of potassium persulfate, 0.35 g sodium metabisufite, 2.0 g Triton 770 (30% active), 2.0 g of ethyl acetate, 18.0 g (45 mole percent) vinylidene chloride, 19.2 g (54 mole percent) of methyl methacrylate, and 1.6 g (1 mole percent) of sodium 2-sulfo-1,1-dimethylethyl acrylamide (50%) were added to the flask. The polymerization reaction was continued for additional 12 hours. The latex was cooled and filtered. The final polymer latex dispersion contained 15.5% solid by weight and the average particle size is 0.062 micron. This polymer dispersion is designated as Polymer Latex 1 (P-2).

Ink Formulation

Ink 1 of the Invention (I-1: Ink Containing Polymer Latex 1)

To prepare the Ink-1, 4.36 g of the Magenta Pigment Dispersion (10% active), 0.2 g Silwet® L-7608 (Crompton Corp.), 2.0 g diethylene glycol and 1.0 g di(propyleneglycol) methyl ether (Dowanol® DPM), 0.6 g 2-pyrrolidone, and 2.90 g of Polymer Latex 1 (13.52% active) were added together with distilled water so that the final weight of the ink was 20.0 g. The final ink contained 2.18% Pigment Red 122, 1.0% Silwet® L-7608, 10.0% diethylene glycol, 5% di(propyleneglycol) methyl ether, 3% pyrrolidone and 2.0% polymer latex 1. The solution was filtered through a 3 μm polytetrafluoroethylene filter.

Ink 2 of the Invention (I-2)

Ink-2 of the present invention was prepared similar to Ink-1 except that the amount of Polymer Latex 1 (13.52% active) was increased from 2.90 g to 6.51 g such that the final ink contained 4.4% polymer latex 1 by weight of the total ink.

Ink 3 of the Invention (I-3)

Ink-3 of the present invention was prepared similar to Ink-1 except that 2.53 g of Polymer Latex 2 (15.5% active) was used instead of Polymer Latex 1 such that the final ink contained 2.0% of Polymer Latex 2 by weight of the total ink.

Ink 4 of the Invention (I-4)

Ink-4 of the present invention was prepared similar to Ink-3 except that amount of Polymer Latex 2 (15.5% active) was increased from 2.53 g to 5.68 g such that the final ink contained 4.4% of Polymer Latex 2 by weight of the total ink.

Comparative Ink 1 (C-1)

The comparative ink 1 was prepared similar to Ink-1 of the Invention except that 1.30 g of Comparative Polymer Dispersion PC-1 (30% active) was used instead of Polymer Latex 1. The final Ink contained 2.0% of Comparative Polymer Dispersion PC-1.

Comparative Ink 2 (C-2)

The comparative ink 2 was prepared similar to Comparative Ink 1 except that the amount of Comparative Polymer Dispersion PC-1 (30% active) was increased from 1.30 g to 2.90 g such that the final Ink contained 4.4% of Comparative Polymer Dispersion PC-1.

Comparative Ink 3 (C-3)

The Comparative Ink 3 was prepared similar to Comparative Ink 1 of the Invention except that 1.57 g of Comparative Polymer Dispersion PC-2 (25% active) was used instead of Comparative Polymer Dispersion 1. The final ink contained 2.0% of Comparative Polymer Dispersion PC-2.

Comparative Ink 4 (C-4)

The Comparative Ink 4 was prepared similar to Comparative Ink 3 of the Invention except that the amount of Comparative Polymer Dispersion PC-2 (25% active) was increased from 1.57 g to 3.52 g such that the final ink contained 4.4% of Comparative Polymer Dispersion PC-2.

Comparative Ink 5 (C-5)

The Comparative Ink 5 of the invention was prepared similar to Ink 1 of the invention except that 4.36 g of distilled water was used instead of Polymer Latex 1 so that the final ink did not contain any polymer latex.

Ink Firability Test

The Inks of the present invention were filled into Epson 880 empty cartridges and printing was done with an Epson 880 Ink jet printer, using the above inks. All inks of the invention fired well through the Epson 880 printer, no nozzles were clogged. The inks were left in printer for over 48 hours and the above printing test was repeated. All the nozzles were firing with minimum cleaning cycles without any problems for the inks of the present invention.

Ink Printing Reliability Test

The inks of the present invention were filled into an ink bag and tested using an Inkjet ink fixture apparatus having a Brother piezo printhead with a heatable printing drum. Ink drop volume was measured vs time to test the printing reliability. A 1" by 10" non-absorbing vinyl substrate, a multi-purpose inkjet cast vinyl (MPI 1005 #226 from Avery Graphics), was mounted on the printing drum. The drum was kept at 50° C. during printing. A 0.7"×4" Dmax density patch print target was printed. After printing, the samples were further heated at 90° C. for 1 minute using an infrared lamp. A successful test result occurred when 67 pL ink droplets of the ink composition were continuously fired through the printhead at a rate of 7,500 drops/second for at least an hour without nozzle failure or ink droplet misdirection.

Durability Test

Sample Preparation

A non-absorbing vinyl substrate, a multi-purpose inkjet cast vinyl (MPI 1005 #226 from Avery Graphics) was cut into 14 by 25 cm in size and placed on a heated coating block with temperature at about 40° C. The above inks were filled into an airbrush (Paasche Sirbrush Set H-3 available from Paasche Airbrush Company, Harwood Heights, Ill.) connected to compressed house air. The pressure of the airbrush was adjusted to about 20 lb such that smooth ink flow was obtained. The inks were sprayed onto the heated vinyl substrates described above. Uniform coatings of the inks were obtained. The selected samples were then heated at 90° C. for 1 minute using an infrared lamp.

Dry Rub Resistance Test

The dry rub resistance test was carried out by rubbing the samples with a dry Q-tip for 4 passes under a consistent pressure in the inked area. The color loss in the treated sample area and the color transfer to Q-tip were examined visually and a rating of the dry rub resistance was given as follows on a scale of 0 to 5.

0: Best, No color loss, and/or color transfer;
1: hardly visible amount of color loss and/or color transfer;
2: visible amount of color loss and/or color transfer;
3: some color loss and color transfer;
4: large amount of color loss and color transfer;
5: Worst, almost complete color loss and color transfer.

Wet Rub Resistance Test:

A wet rub resistance test was carried out by placing an approximately 2.54 cm diameter water droplet on the ink-coated sample surface for 5 minutes, after which the excess water was wiped off with a paper towel. The above treated area was then rubbed with a dry paper towel for 4 passes under a consistent pressure a 3.5 cm diameter area. The color loss in the treated sample area and the color transfer to the paper towel were examined visually and a rating of the wet rub resistance was given similar as above on a scale of 0 to 5, 0 being the best and 5 being the worst. Both of the dry and wet rub resistance test results are shown in Table 1.

TABLE 1

| Ink | Polymer | Polymer/Pigment Ratio | Dry Rub Rating | Wet Rub Rating |
| --- | --- | --- | --- | --- |
| C-1 | PC-1 | 1/1 | 1 | 2 |
| C-3 | PC-2 | 1/1 | 1 | 3 |
| I-1 | P-1 | 1/1 | 0 | 1 |
| I-3 | P-2 | 1/1 | 0 | 1 |
| C-2 | PC-1 | 2/1 | 2 | 1 |
| C-4 | PC-2 | 2/1 | 1 | 2 |
| I-2 | P-1 | 2/1 | 0 | 0 |
| I-4 | P-2 | 2/1 | 0 | 1 |
| C-5 | N/A | N/A | 4 | 5 |

From the above table, it is evident that the presence of polymer latex in the ink significantly improves the image durability under both dry and wet conditions compared to the inks without polymer latex. The inks of the present invention show further advantages in image durability compared to the comparative inks.

The invention has been described in detail with particular reference to certain preferred embodiments thereof, but it will be understood that variations and modifications can be effected within the spirit and scope of the invention.

What is claimed is:

1. An aqueous ink jet ink composition comprising:
   (a) a pigment that is encapsulated or is stabilized with a dispersant;
   (b) a single polymer latex as binder, wherein said polymer is a copolymer comprised of less than 20 mole % hydrophilic monomer units and at least about 45 mole percent vinylidene chloride monomer, based on the total monomer in the polymer, said polymer having a Tg of 5 to 100° C.;
   (c) a humectant; and
   (d) at least one surfactant.

2. The ink composition of claim 1 wherein the weight ratio of the pigment to the polymer is 1:20 to 20:1.

3. The ink composition of claim 1 wherein the weight ratio of the pigment to the polymer is 1:5 to 2:1.

4. The ink composition of claim 1 wherein said pigment has a particle size of less than 0.5 micron.

5. The ink composition of claim 1 wherein said pigment comprises up to 10% by weight of the ink composition.

6. The composition of claim 1 wherein said polymer latex has a Tg of 10 to 80° C.

7. The composition of claim 1 wherein said polymer latex has an average particle size of less than 2 micron.

8. The composition of claim 1 wherein the polymer latex has an average particle size of less than 0.5 micron.

9. The composition of claim 1 wherein said polymer latex comprises less than 5 mole % hydrophilic monomer units based on the total monomer units in the polymer latex.

10. The composition of claim 1 wherein said polymer latex comprises only hydrophobic monomer units in the polymer latex.

11. The composition of claim 1 wherein said polymer latex comprises hydrophilic monomer unit selected from the group consisting of acrylic acid, methacrylic acid, chloromethacrylic acid, maleic acid, allylamine, N,N-diethylallylamine, vinyl sulfonamide, sodium acrylate, sodium methacrylate, ammonium acrylate, ammonium methacrylate, acrylamidopropane-triethylammonium chloride, methacrylamidopropane-triethylammonium chloride, vinyl-pyridine hydrochloride, sodium vinyl phosphonate and sodium 1-methylvinylphosphonate, sodium vinyl sulfonate, sodium 1-methylvinyl-sulfonate and sodium styrenesulfonate, ethyoxytriethylene glycol methacrylate, methoxypolyethylene oxide methacrylate, methoxypropylene oxide acrylate, polyethyleneoxide methacrylate, polyethylenoxide acrylate and N-vinyl pyrrolidone.

12. The composition of claim 1 wherein the polymer further comprises at least one additional ethylenically-unsaturated monomer capable of addition polymerization that is selected from the group consisting of methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, 2-hydroxypropyl methacrylate, acrylonitrile, methacrylonitrile, vinyl acetate, vinyl propionate, vinylidene chloride, vinyl chloride, styrene, t-butyl styrene, vinyl toluene, butadiene, isoprene, N,N-dimethyl acrylamide, acrylic acid, methacrylic acid, chloromethacrylic acid, maleic acid, allylamine, N,N-diethylallylamine, vinyl sulfonamide, sodium acrylate, sodium methacrylate, ammonium acrylate, ammonium methacrylate, acrylamidopropane-triethylammonium chloride, methacrylamidopropane-triethylammonium chloride, vinyl-pyridine hydrochloride, sodium vinyl phosphonate and sodium 1-methylvinylphosphonate, sodium vinyl sulfonate, sodium 1-methylvinyl-sulfonate and sodium styrenesulfonate.

13. The composition of claim 1, wherein the ink jet ink composition further comprises a silicon surfactant or fluorinated surfactant.

* * * * *